United States Patent
Su et al.

[11] Patent Number: 5,837,124
[45] Date of Patent: Nov. 17, 1998

[54] METHOD AND APPARATUS FOR PREVENTING SCALE FROM PRECIPITATING IN PRODUCING DEIONIZED WATER

[75] Inventors: Qingquan Su; Syu Nakanishi; Takayuki Saito; Masato Nakatsu, all of Kanagawa-ken, Japan

[73] Assignee: Ebara Corporation, Tokyo, Japan

[21] Appl. No.: 959,859

[22] Filed: Oct. 29, 1997

[30] Foreign Application Priority Data

Oct. 29, 1996 [JP] Japan .................................. 8-302377

[51] Int. Cl.$^6$ ........................... C02F 1/461; C02F 1/469; B01D 61/44
[52] U.S. Cl. ........................... 205/746; 204/525; 204/634
[58] Field of Search .................. 204/525, 634; 205/746

[56] References Cited

U.S. PATENT DOCUMENTS

| | | |
|---|---|---|
| 4,115,225 | 9/1978 | Parsi ........................ 204/525 |
| 4,814,281 | 3/1989 | Byers . |
| 5,308,467 | 5/1994 | Sugo et al. . |
| 5,593,554 | 1/1997 | Yamanaka et al. . |
| 5,720,869 | 2/1998 | Yamanaka et al. ................. 205/746 |

FOREIGN PATENT DOCUMENTS

| | | |
|---|---|---|
| 1307410 | 12/1989 | Japan . |
| 655171 | 3/1994 | Japan . |

*Primary Examiner*—Arun S. Phasge
*Attorney, Agent, or Firm*—Browdy and Neimark

[57] ABSTRACT

A method for preventing scale from precipitating and an apparatus for producing deionized water are disclosed. The acidic water produced by electrolysis in the electrolysis unit (30) is introduced into a concentrating compartment (19) in the continuous deionization unit (10). The pH of the concentrated water in the concentrating compartment decreases, thereby preventing scale from precipitating.

13 Claims, 2 Drawing Sheets

METHOD AND APPARATUS FOR PREVENTING SCALE FROM PRECIPITATING IN PRODUCING DEIONIZED WATER

BACKGROUND OF THE INVENTION

The present invention relates to a method and apparatus for preventing scale from precipitating in producing deionized water. The present application may be applied to removing ions in water in such areas as electric power, nuclear power generation, electronic industry, pharmaceutical industry, food industry, chemical industry and the like.

An electrodialysis apparatus has been used to produce deionized water. Electrodialysis refers to a process for removing ions across a membrane from one solution to another under the influence of a direct current. A multicompartment electrodialysis has been proposed in which a plurality of anion exchange membranes alternated with a plurality of cation exchange membrane.

The electrodialysis apparatus produces not only the deionized water in diluting compartments but also a concentrated water in concentrating compartments. Since the concentrated water has an increased concentration of salts, and scale tends to precipitate on surfaces of ion exchange membranes and an electrode, which are in contact with the concentrated water, and which define the concentrating compartments. As the scale precipitates, an electric resistance of the electrodialysis apparatus increases. In an extreme case, a substantial electric current does not flow through the electrodialysis apparatus, and further deionized water cannot be produced until the scale is removed.

It has been proposed to prevent scale from precipitating. Such proposals include: adding an agent for preventing the scale, for example, sodium hexametaphosphate to a water to be treated; reversing the polarity of the electrodes; to set a low electric current density so as to decrease a difference in concentration between the deionized water in the diluting compartments and the concentrated water in the concentrating compartments; and to pretreat the water to be treated, for example, removing carbonate ions and adding a chemical agent for softening the water to be treated.

However, the addition of the agent for preventing the scale requires continued supplementation and control of the agent. Moreover, the agent for preventing scale remains in waste water, and the agent needs to be removed therefrom, thereby increasing labor and costs. The reversal of the polarity of the electrodes exchanges the diluting compartments and the concentrating compartments, thereby decreasing efficiency to remove ions. To set the lower electric current density requires an increased area in the ion exchange membranes for an amount of water to be treated, thereby enlarging the apparatus and increasing costs. The pretreatment enlarges the apparatus and increase the costs.

SUMMARY OF THE INVENTION

It is an object of the present invention to solve the aforementioned problems and to provide a novel method and an apparatus for preventing scale from precipitating in producing deionized water.

According to one aspect of the present invention, there is provided a method for preventing scale from precipitating in producing deionized water comprising the steps of: providing a continuous deionization unit having: a first housing; a pair of first electrodes serving as an anode and a cathode; a plurality of anion exchange membranes being disposed between the pair of the first electrodes in the first housing; and a plurality of cation exchange membranes being disposed between the pair of the first electrodes in the first housing and alternated with the anion exchange membranes; wherein the first housing, the anion exchange membranes and the cation exchange membranes define at least one diluting compartment and at least one concentrating compartment being alternated with each other; providing an electrolysis unit having: a second housing; a pair of second electrodes serving as an anode and a cathode; wherein the second housing and the ion exchange membrane define an anode compartment and a cathode compartment; introducing water into the anode compartment and the cathode compartment in the electrolysis unit; applying an electric direct current to the pair of the second electrodes so as to produce acidic water in the anode compartment; and introducing the acidic water into the concentrating compartment in the continuous deionization unit.

Preferably, the acidic water has pH ranging from about 2 to about 5. Further preferably, the acidic water has pH ranging from about 2 to about 4.

In the present invention, the method may have the steps of introducing an ion-containing water into a continuous deionization unit; applying an electric direct current to the pair of the first electrodes in the continuous deionization unit so as to produce deionized water in the diluting compartment and a concentrated water in the concentrating compartment; and discharging the deionized water from the diluting compartment.

Preferably, the method may further have the step of introducing the concentrated water in the concentrating compartment into at least one of the anode compartment and the cathode compartment in the electrolysis unit.

Preferably, the ion-containing water has a calcium concentration ranging from 0.01 to 100 mg per liter, a magnesium concentration ranging from 0.01 to 80 mg per liter, and a silicon content of up to 40 mg per liter. Further preferably, the ion containing water has a calcium concentration ranging from 0.01 to 40 mg per liter, a magnesium concentration ranging from 0.01 to 30 mg per liter, and a silicon content of up to 30 mg per liter.

According to another aspect of the present invention, there is provided an apparatus for producing deionized water comprising: a continuous deionization unit having: a first housing: a pair of first electrodes serving as an anode and a cathode; a plurality of anion exchange membranes being disposed between the pair of the first electrodes in the first housing; and a plurality of cation exchange membranes being disposed between the pair of the first electrodes in the first housing and alternated with the anion exchange membranes; wherein the first housing, the anion exchange membranes and the cation exchange membranes define at least one diluting compartment and at least one concentrating compartment being alternated each other; and an electrolysis unit having: a second housing; a pair of second electrodes serving as an anode and a cathode; an ion exchange membrane being disposed in the second housing and separating one of the second electrodes from the other second electrodes; wherein the second housing and the ion exchange membrane define a cathode compartment and an anode compartment, and the anode compartment communicates with the concentrating compartment in the continuous deionization unit.

In the present invention, the apparatus may further comprise a first manifold connecting the anode compartment in the electrolysis unit to the concentrating compartment in the continuous deionization unit.

Preferably, the concentrating compartment in the continuous deionization unit communicates with at least one of the anode compartment and the cathode compartment in the electrolyses unit.

The apparatus may further comprise a second manifold connecting the concentrating compartment in the continuous deionization unit to at least one of the anode compartment and the cathode compartment in the electrolysis unit.

Preferably, the ion exchange membrane comprises a cation exchange membrane.

The apparatus may further comprise an electric source for applying an electric direct current to the pair of the first electrodes and the pair of the second electrodes.

In the present invention, an acidic water produced in the anode compartment is introduced into the concentrating compartment so as to decrease pH of the concentrated water therein, thereby preventing a scale from precipitating.

PREFERRED EMBODIMENTS OF THE PRESENT INVENTION

Figure 1:
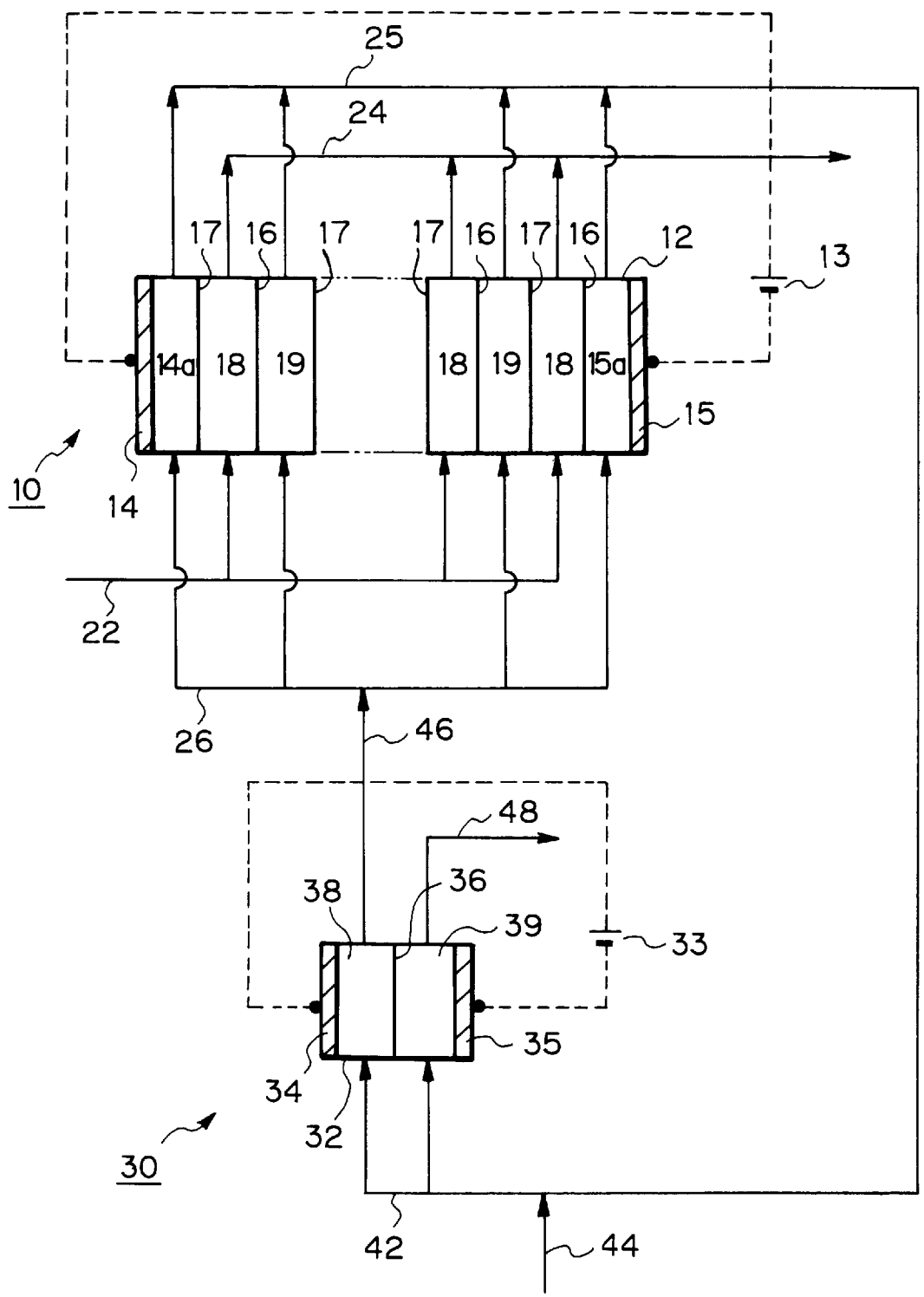
FIG. 1 is a schematic view of one embodiment in accordance with the present invention.

In FIG. 1, a continuous deionization apparatus in accordance with the present invention has a continuous deionization unit 10 and an electrolysis unit 30. The continuous deionization unit 10 has a housing 12 and a pair of electrodes 14, 15 serving as an anode and a cathode, respectively. The electrodes may have a plate shape, although the configuration of the electrodes is not limited. Materials for the electrode are not limited as long as the materials are electrically conductive. An electric source 13 is provided so as to supply an electric direct current to the pair of the electrodes 14, 15. The electrodes 14, 15 face electrode compartments 14a, 15a, respectively, in which water can be charged. In the electrode compartments 14a, 15a, ion concentrations of water increase and, in this sense, the electrode compartments can be regarded as the concentrating compartments.

A plurality of cation exchange membranes 16 are alternated with a plurality of anion exchange membranes 17 between the pair of the electrodes 14, 15 in the housing 12. The housing 12, the cation exchange membranes 16 and the anion exchange membranes 17 define at least one diluting compartment 18 and at least one concentrating compartment 19 being alternated with each other.

Preferably, a cation exchanger and/or an anion exchanger fill the diluting compartments 18 for removing ions further, thereby producing deionized water having a further decreased ion concentration.

The diluting compartments 18 are connected to a supply line 22 for supplying a water to be treated and to a discharge line 24 for discharging deionized water. On the other hand, the concentrating compartments 19 are connected to a discharge line 25 for discharging a concentrated water.

The electrolysis unit 30 has a housing 32 and a pair of electrodes 34, 35 serving as an anode and a cathode. An electric source 33 is provided so as to supply an electric direct current to the pair of the electrodes 34, 35. As shown in FIG. 1, the electric source 33 may be different from the electric source 14. Alternatively, a single electric source may be shared by way of a serial or parallel connection.

An ion exchange membrane 36 is disposed in the housing 32 and separates the electrode 34 from the electrode 35. The housing 32 and the ion exchange membrane 36 define an anode compartment 38 and a cathode compartment 39.

In the present invention, preferably, the ion exchange membrane 36 comprises the cation exchange membrane so as to further remove a scale component such as a calcium ion, magnesium ion from an acidic water produced in the anode compartment 38.

The anode compartment 38 and the cathode compartment 39 are connected to a supply line 42 for introducing a water thereinto. The supply line may be connected to a water supply line 44 for supplying, for example, tap water.

As shown in FIG. 1, preferably, the discharge line 25 of the continuous deionizing unit 10 is connected to a supply line 42 of the electrolysis unit 10 for introducing the concentrated water produced in the concentrating compartments 19 of the continuous deionizing unit 10 into the anode compartment 38 and the cathode compartment 39 of the electrolysis unit 30 so as to recycle the concentrated water and provide a sufficient conductivity in the water of the anode and cathode compartments 38, 39.

In the present invention, the anode compartment 38 of the electrolysis unit 30 communicates with the concentrating compartments 19 in the continuous deionization unit 10 for introducing an acidic water produced in the anode compartment 38 into the concentrating compartment 19 so as to decrease pH of the concentrated water therein, thereby preventing scale from precipitating. In FIG. 1, a manifold 26, serving as the supply line to the concentrating compartments 19, connects the anode compartment 38 in the electrolysis unit 30 to the concentrating compartments 19 in the continuous deionization unit 10.

A method of the present invention is explained hereinafter.

The electric source 13 applies a direct current to the anode 14 and the cathode 15, and cations in water tend to move toward the negatively charged cathode 15. The cations are able to permeate the cation-exchange membranes 16 but not the anion-exchange membranes 17. On the other hand, anions tend to move toward the positively charged anode 14. The anions are able to permeate the anion-exchange membranes 17 but not the cation-exchange membrane 18. As a result, the water in the diluting compartments 18 is depleted of ions, thereby producing a deionized water. On the other hand, the water in the concentrating compartments 10 is enriched by ions, thereby producing a concentrated water. Since the concentrated water has an increased salt concentration, a scale tends to precipitate on surfaces of ion exchange membranes that face the concentrating compartments 19.

The deionized water in the diluting compartments 18 is discharged therefrom through the discharge line 24 whereas the concentrated water in the concentrating compartments 19 is discharged therefrom through the discharge line 25.

Water, preferably a water containing an electrolyte, is introduced into the anode compartment 38 and the cathode compartment 39 of the electrolysis unit 30. For example, the concentrated water produced in the concentrating compartments 19 may be introduced into at least one of the anode compartments 38 and the cathode compartments 39 of the electrolysis unit 30 so as to recycle the concentrated water and provide a sufficient conductivity in the water of the anode and cathode compartments 38, 39.

The electric source 33 applies a direct current to the anode 34 and the cathode 35 so as to electrolyze the water in the anode compartment 38 and the cathode compartment 39 of the electrolysis unit 30. As a result, cations and anions permeate the ion exchange membrane 36 so as to produce an acidic water in the anode compartment 38 and an alkaline water in the cathode compartment. 39.

In the present invention, preferably, the acidic water produced in the anode compartment 38 has pH ranging from about 2 to about 5. Further preferably, the acidic water produced in the anode compartment 38 has pH ranging from about 2 to about 4. When the acidic water has pH larger than 5, a large quantity of the acidic water is required to decrease pH of the concentrated water in the concentrating compartments 19. On the other hand, when the acidic water has pH smaller than 2, special materials withstanding acidity are necessary for the housing 32, the discharge line 46 and the like, which are in contact with the acidic water. Moreover, the cost for producing the acidic water by electrolysis increases.

The acidic water thus produced is introduced into the concentrating compartments 19 in the continuous deionization unit 10 by means of, for example, the discharge line 46 and the supply line 26. The acidic water decreases pH of the concentrated water in the concentrating compartments 19, thereby preventing a scale from precipitating therein. The alkaline water in the cathode compartment 39 is discharged through the discharge line 48. Contrary to related art of reversing the polarity of the deionizing unit 10, the diluting compartments and the concentrating compartments do not exchange.

Figure 2:
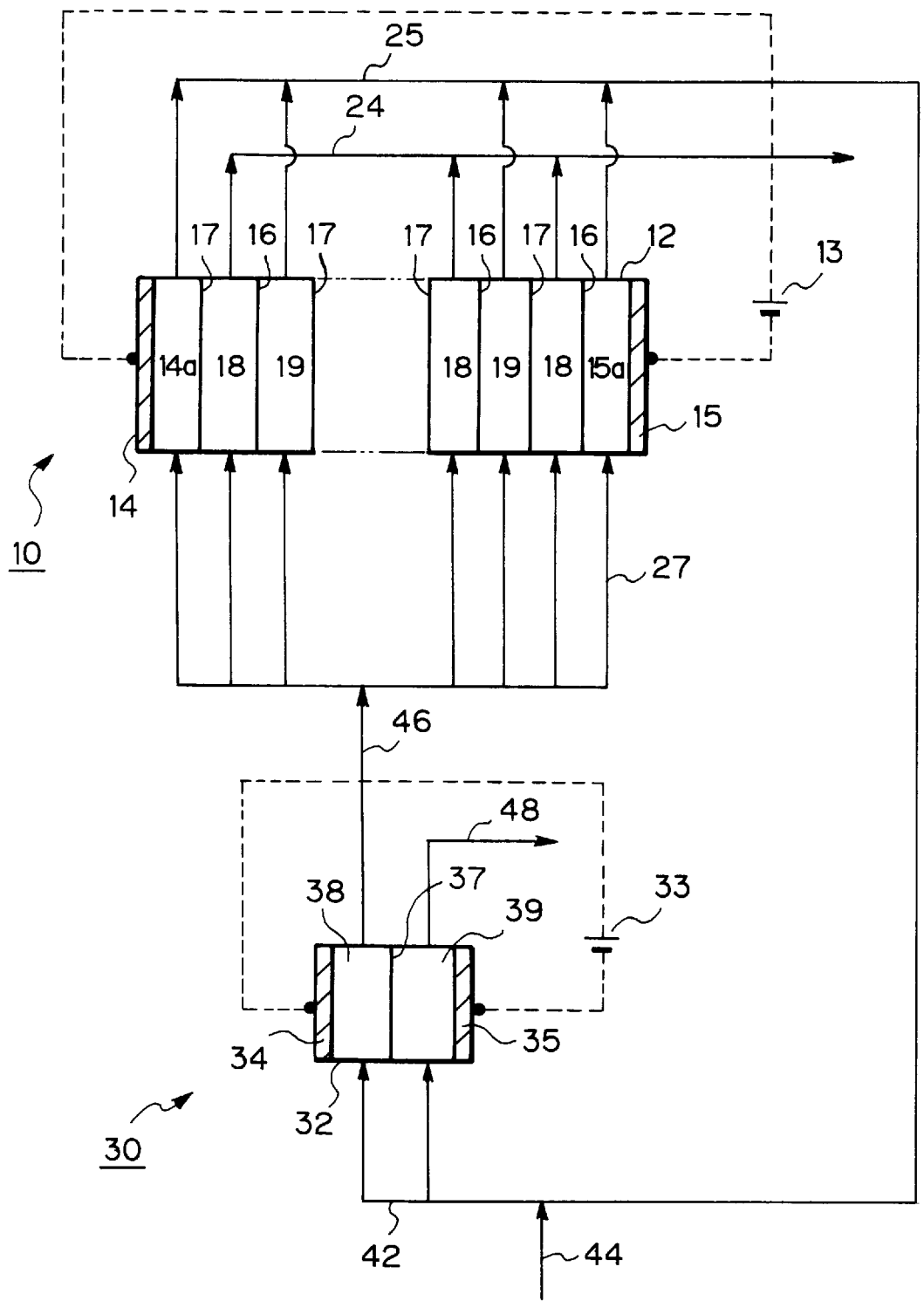
FIG. 2 is a schematic view of another embodiment in accordance with the present invention.

FIG. 2 shows another embodiment of the present invention. The same reference numerals in FIG. 2 refer to the same elements as those of FIG. 1.

In FIG. 2, only the acidic water produced in the anode compartment 38 of the electrolysis unit 30 is introduced into the diluting compartments 18 and the concentrating compartments 19 of the continuous deionizing unit 10 by means of, for example, the discharge line 46 and the supply line 27 for introducing water to the diluting compartments 18 and the concentrating compartments 19.

In this embodiment, a cation exchange membrane 37 is used in the electrolysis unit 30 so as to produce an acidic water being free of cations such as calcium ion, magnesium ion and the like. Calcium compounds and magnesium compounds are major contributors in the scale. Therefore, the acidic water free of such scale components is introduced into the diluting compartments 18 and the concentrating compartments 19 so as to further prevent scale from precipitating.

Scale precipitated generally contain calcium compounds, for example, calcium carbonate; magnesium compounds, for example, magnesium hydroxide; and gel materials, for example, silicon dioxide.

The present invention may be applied to tap water, and water obtained by reverse osmosis membrane. Although sea water may be treated by the method and apparatus of the present invention, the sea water preferably be treated by, for example, the reverse osmosis membrane so as to decrease concentrations of salts, and then the resulting diluted water is further treated by the method and the apparatus of the present invention. On the other hand, it might be unnecessary to apply the method and the apparatus of the present invention to an ion exchanged water, which is free of ions and such scale components as the calcium compounds and the magnesium compounds.

In view of the foregoing, the water that is introduced into the diluting compartments 18 may contain ions and may have a calcium concentration ranging from 0.01 to 100 mg per liter, preferably from 0.01 to 40 mg per liter, and a magnesium concentration ranging from 0.01 to 80 mg per liter, preferably 0.01 to 30 mg per liter.

The ion containing water may have conductivity up to 1000 $\mu$S/cm, preferably up to 300 $\mu$S/cm. The ion containing water may have a silicon content of up to 40 mg per liter, preferably up to 30 mg per liter.

In the present invention, the cation exchange membranes and the anion exchange membranes are not limited.

EXAMPLES

The present invention is explained by way of examples hereinafter. The examples are illustrative and should not be interpreted as limiting the scope of the present invention.

The continuous deionizing apparatus of FIG. 1 is used. However, contrary to FIG. 1, the discharge line 24 was not connected to the supply line 42. The apparatus had two diluting compartments 18, one concentrating compartment 19, and two electrode compartments 14a, 15a. Nonwoven fabric having a trade name under EPIX FILTER produced by Ebara Corporation, Japan comprising a cation exchanger in fiber configuration and anion exchanger in fiber configuration filled both of the diluting compartments 18. Each of the electrodes 14, 15 had a plate consisting essentially of titanium and a platinum coating electroplated onto one of the major surface of the plate. Cation exchange membranes having a trade name under CMX from Tokuyama Inc. (Japan) and the anion exchange membrane having a trade name under AMX from Tokuyama Inc. (Japan) were used.

A tap water having conductivity of about 200 $\mu$S/cm was introduced into the diluting compartment 18 through the supply line 22 at the rate of 30 liters per hour. The tap water had a calcium content of 20 milligram per liter, a sodium content of 9 milligram per liter, chlorine content of 15 milligram per liter, a sulfate content of 20 milligram per liter, a silica content of 20 milligram per liter. The tap water is introduced into the anode compartment 38 and the cathode compartment 39 of the electrolysis unit 30 through the supply line 44 at a flow rate LV of 0.1 to 3.0 centimeter per second.

An acidic water produced in the anode compartment 38 was introduced into the concentrating compartment 19 and the electrode compartments 14a, 15a at a rate of 10 liters per hour. 0.75 amperes of electric direct current was applied to the continuous deionizing unit 10 while 1.0 ampere of electric direct current was applied to the electrolysis unit 30. Under these conditions, the acidic water had pH of about 3.

As a comparative example, the same experiment was carried out using the apparatus having the continuous deionization unit 10 but not having the electrolysis unit 30. In the apparatus, the tap water was introduced into not only the diluting compartment 18 but also the concentrating compartment 19 and the electrode compartments 14a, 15a.

Even after operating the apparatus in accordance with the present invention in a period of 200 hours, a scale precipitation onto surfaces of the cation exchange membranes 16, anion exchange membranes 17 and the electrodes 14, 15 were not observed. In contrast, after operating the apparatus of the comparative example for a period of about 50 hours, a large quantity of scale precipitated onto surfaces of the cation exchange membranes 16, anion exchange membranes 17 and the electrodes 14, 15, and a sufficient amount of the electric direct current did not flow any longer.

What is claimed is:

1. A method for preventing scale from precipitating in producing deionized water comprising the steps of:

providing a continuous deionization unit having: a first housing; a pair of first electrodes serving as an anode and a cathode; a plurality of anion exchange membranes being disposed between the pair of the first electrodes in the first housing; and a plurality of cation exchange membranes being disposed between the pair of the first electrodes in the first housing and alternated with the anion exchange membranes; wherein the first housing, the anion exchange membranes and the cation exchange membranes define at least one diluting compartment and at least one concentrating compartment being alternated with each other;

providing an electrolysis unit having: a second housing; a pair of second electrodes serving as an anode and a cathode; wherein the second housing and an ion exchange membrane define an anode compartment and a cathode compartment;

introducing water into the anode compartment and the cathode compartment in the electrolysis unit;

applying an electric direct current to the pair of the second electrodes so as to produce an acidic water in the anode compartment; and introducing the acidic water into the concentrating compartment in the continuous deionization unit.

2. A method of claim 1 wherein the acidic water has pH ranging from about 2 to about 5.

3. A method of claim 1 wherein the acidic water has pH ranging from about 2 to about 4.

4. A method of claim 1, further comprising the steps of introducing an ion-containing water into a continuous deionization unit;

applying an electric direct current to the pair of the first electrodes in the continuous deionization unit so as to produce deionized water in the diluting compartment and a concentrated water in the concentrating compartment; and discharging the deionized water from the diluting compartment.

5. A method of claim 4, further comprising the step of introducing the concentrated water in the concentrating compartment into at least one of the anode compartment and the cathode compartment in the electrolysis unit.

6. A method of claim 4 wherein the ion-containing water has a calcium concentration ranging from 0.01 to 100 mg per liter, a magnesium concentration ranging from 0.01 to 80 mg per liter, and a silicon content of up to 40 mg per liter.

7. A method of claim 6 wherein the ion-containing water has a calcium concentration ranging from 0.01 to 40 mg per liter, a magnesium concentration ranging from 0.01 to 30 mg per liter, and a silicon content of up to 30 mg per liter.

8. An apparatus for producing deionized water comprising:

a continuous deionization unit having:
a first housing:
a pair of first electrodes serving as an anode and a cathode;
a plurality of anion exchange membranes being disposed between the pair of the first electrodes in the first housing; and
a plurality of cation exchange membranes being disposed between the pair of the first electrodes in the first housing and alternated with the anion exchange membranes;
wherein the first housing, the anion exchange membranes and the cation exchange membranes define at least one diluting compartment and at least one concentrating compartment being alternated each other; and an electrolysis unit having:
a second housing;
a pair of second electrodes serving as an anode and a cathode;
an ion exchange membrane being disposed in the second housing and separating one of the second
wherein the second housing and the ion exchange membrane define a cathode compartment and an anode compartment, and the anode compartment communicates with the concentrating compartment in the continuous deionization unit.

9. An apparatus of claim 8, further comprising a first manifold connecting the anode compartment in the electrolysis unit to the concentrating compartment in the continuous deionization unit.

10. An apparatus of claim 8 wherein the concentrating compartment in the continuous deionization unit communicates with at least one of the anode compartment and the cathode compartment in the electrolysis unit.

11. An apparatus of claim 10, further comprising a second manifold connecting the concentrating compartment in the continuous deionization unit to at least one of the anode compartment and the cathode compartment in the electrolysis unit.

12. An apparatus of claim 8, wherein the ion exchange membrane comprises a cation exchange membrane.

13. An apparatus of claim 8, further comprising an electric source for applying an electric direct current to the pair of the first electrodes and the pair of the second electrodes.

* * * * *